United States Patent
Thomas et al.

(10) Patent No.: US 6,952,708 B2
(45) Date of Patent: Oct. 4, 2005

(54) METHOD AND SYSTEM FOR USING A SYNC KEY

(75) Inventors: Edward Eric Thomas, Redmond, WA (US); Stephen D. Flanagin, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 896 days.

(21) Appl. No.: 09/892,679

(22) Filed: Jun. 27, 2001

(65) Prior Publication Data

US 2003/0005342 A1 Jan. 2, 2003

(51) Int. Cl.[7] .............................................. G06F 17/00
(52) U.S. Cl. .................... 707/104.1; 707/102; 707/100; 707/203; 707/204
(58) Field of Search ................................ 707/100, 102, 707/104.1, 103 Y, 202–204; 709/213

(56) References Cited

U.S. PATENT DOCUMENTS

| | | | | |
|---|---|---|---|---|
| 5,224,212 A | * | 6/1993 | Rosenthal et al. | ............. 710/53 |
| 5,799,322 A | * | 8/1998 | Mosher, Jr. | ................. 707/202 |
| 6,502,205 B1 | * | 12/2002 | Yanai et al. | .................... 714/7 |
| 6,553,409 B1 | * | 4/2003 | Zhang et al. | ............... 709/213 |

FOREIGN PATENT DOCUMENTS

| | | |
|---|---|---|
| EP | 0 974 895 A2 | 1/2000 |
| WO | WO 97/04391 | 2/1997 |
| WO | WO 00/62201 | 10/2000 |

OTHER PUBLICATIONS

Per Cederqvist et al., "Version Management with CVS for CVS 1.11.2", Version Management with CVS, Online pp. 1–6 and 33–50, Retrieved on Oct. 28, 2002.

* cited by examiner

*Primary Examiner*—Alford Kindred
*Assistant Examiner*—Sana Al-Hashemi
(74) *Attorney, Agent, or Firm*—Merchant & Gould; Ryan T. Grace

(57) ABSTRACT

A method and system for synchronization of data stores is described. A synchronization initiator sends a sync key to a synchronization partner requesting to synchronize to some checkpoint. An integer is used as the sync key. When the sent sync key is zero the synchronization partner performs an initial synchronization. When the sent sync key is a value other than zero, the synchronization partner attempts to synchronize to the desired state. The value of the sync key is incremented only upon successful synchronization. A sync server can also include a sync key with change update notifications sent to a sync client, which the client can use to determine if the update notification is a valid update from the current sync state or is a delayed and obsolete update that should be discarded.

20 Claims, 9 Drawing Sheets

| Steps | Client | Server |
|---|---|---|
| 1 | Initial Sync Key | Receive Request |
| 2 | | Process Request |
| 3 | Receive Entries | Return Changed Entries |
| 4 | SyncKey 1 + Updates since Step 1 | Receive Request |
| 5 | | Process Request |
| 6 | Receive Entries | Return Updated Entries |
| 7 | SyncKey 2 + updates since Step 4 | Receive Request |
| 8 | | Process Request |
| 9 | SyncKey 2 + updates since Step 4 | Process Request |
| 10 | | Return Updated Entries |

METHOD AND SYSTEM FOR USING A SYNC KEY

FIELD OF THE INVENTION

The present invention relates generally to computer software, and more particularly to synchronization of data.

BACKGROUND OF THE INVENTION

Computing devices may store data in more than one place. When the same or related information is stored in two places, it is possible for the data to change in one location (store) and not in another. Synchronization methods have been developed to propagate the changes between the different stores, so that the information in the different stores correlate to each other.

In one method, during synchronization, changes to the data in the different stores are collected, compared, and reconciled. The synchronization process itself involves making changes ("sync changes") to the data stores in order to "update" or propagate the changes made in other stores. All of the required changes to synchronize the stores may not be completed during each synchronization attempt. For example, a connection between stores may be broken during the process causing the synchronization attempt to be incomplete. One store, however, may indicate that synchronization has completed successfully when in fact the synchronization was unsuccessful.

In another method, changes are sent incrementally between the stores using notifications as the changes occur. Some implementations utilize both of these methods together.

SUMMARY OF THE INVENTION

The present invention is directed at providing a system and method for synchronizing data stores. On each synchronization update, the syncing entities attempt to update each other up to the state at the time of the sync request is processed. This time or state is referred to as the synchronization checkpoint ("sync checkpoint"). According to one aspect of the invention, each of these checkpoints is given a unique synchronization key ("sync key") to represent the checkpoint state.

According to one aspect of the invention, a sync initiator sends the sync key that it received in response to the last successful synchronization to the synchronization partner. If the receiving partner receives a valid sync key from the sender then the receiver responds to the client's request. Otherwise, the receiver responds to the sender as appropriate. For example, the receiver could reply to the sender indicating that the sync key is not valid.

According to another aspect of the invention, the sync key is an integer that begins at zero and is incremented with each sync attempt that is successfully completed. The synchronization initiator (the sender of the synchronization request) determines the value of its sync key, which is based on its last synchronization attempt. The sync key is incremented only upon the successful receipt and processing of the last sync response.

According to yet another aspect of the present invention, a sync initiator can sync to a new checkpoint, resync from the last checkpoint, or initiate a completely new sync from scratch. For example, if N is the sync key value from the last successful sync, the sync initiator may send a sync key value of N to indicate that it received the sync response for the last sync and wishes to sync from that checkpoint to the current state. If the sync initiator sends a request with sync key=N−1, the sync partner determines that the sync initiator did not receive a response to its last sync request or otherwise wishes to resync again from the last successfully processed sync state.

BRIEF DESCRIPTION OF THE DRAWINGS

FIG. 4 is a table illustrating exemplary synchronization steps;

DETAILED DESCRIPTION OF THE PREFERRED EMBODIMENT

The present invention is directed at providing a method and system for synchronizing data. Briefly described, a synchronization key indicating a synchronization checkpoint is sent by a synchronization initiator to a synchronization partner. If the synchronization key received by the synchronization partner is valid, the partner returns synchronization data to the initiator to synchronize the stores between the initiator and partner.

Figure 1:
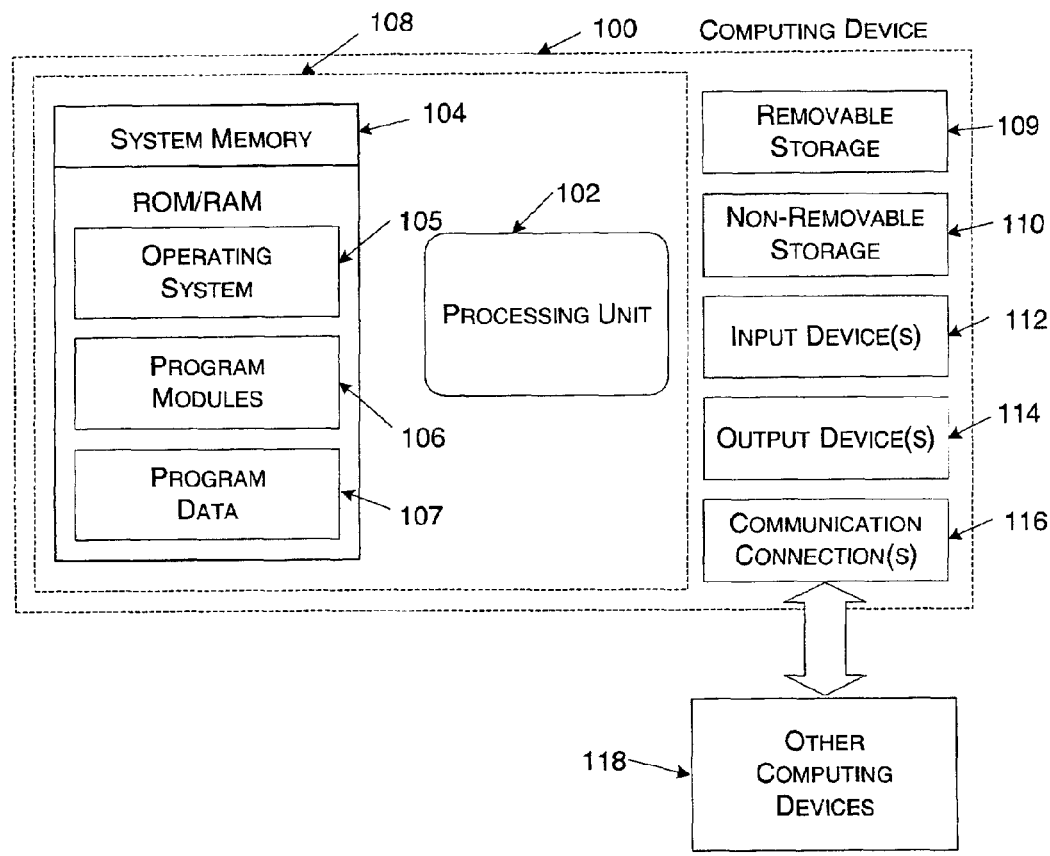
FIG. 1 is a functional block diagram of one computing device adapted to implement one embodiment of the invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
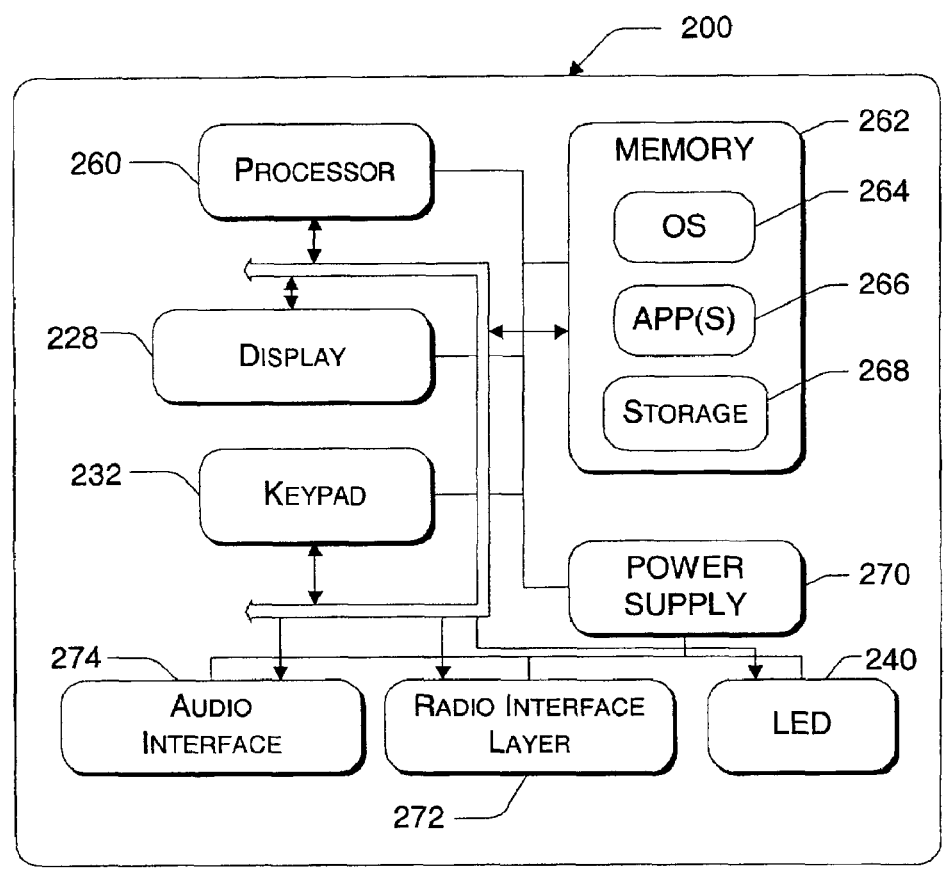
FIG. 2 illustrates a mobile computing device that may be used in one exemplary embodiment of the present invention.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has a processor 260, a memory 262, a display 228, and a keypad 232. The memory 262 generally includes both volatile memory (e.g., RAM) and non-volatile memory (e.g., ROM, Flash Memory, or the like). The mobile computing device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing application, and the like. A synchronization application also resides on the mobile computing device 200 and is programmed to interact with a corresponding synchronization application resident on a host or server computer to keep the information stored in the storage 268 synchronized with corresponding information stored at the host computer.

The mobile computing device 200 has a power supply 270, which may be implemented as one or more batteries. The power supply 270 might further include an external power source, such as an AC adapter or a powered docking cradle that supplements or recharges the batteries.

The mobile computing device 200 is shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving communications, such as radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

Figure 3:
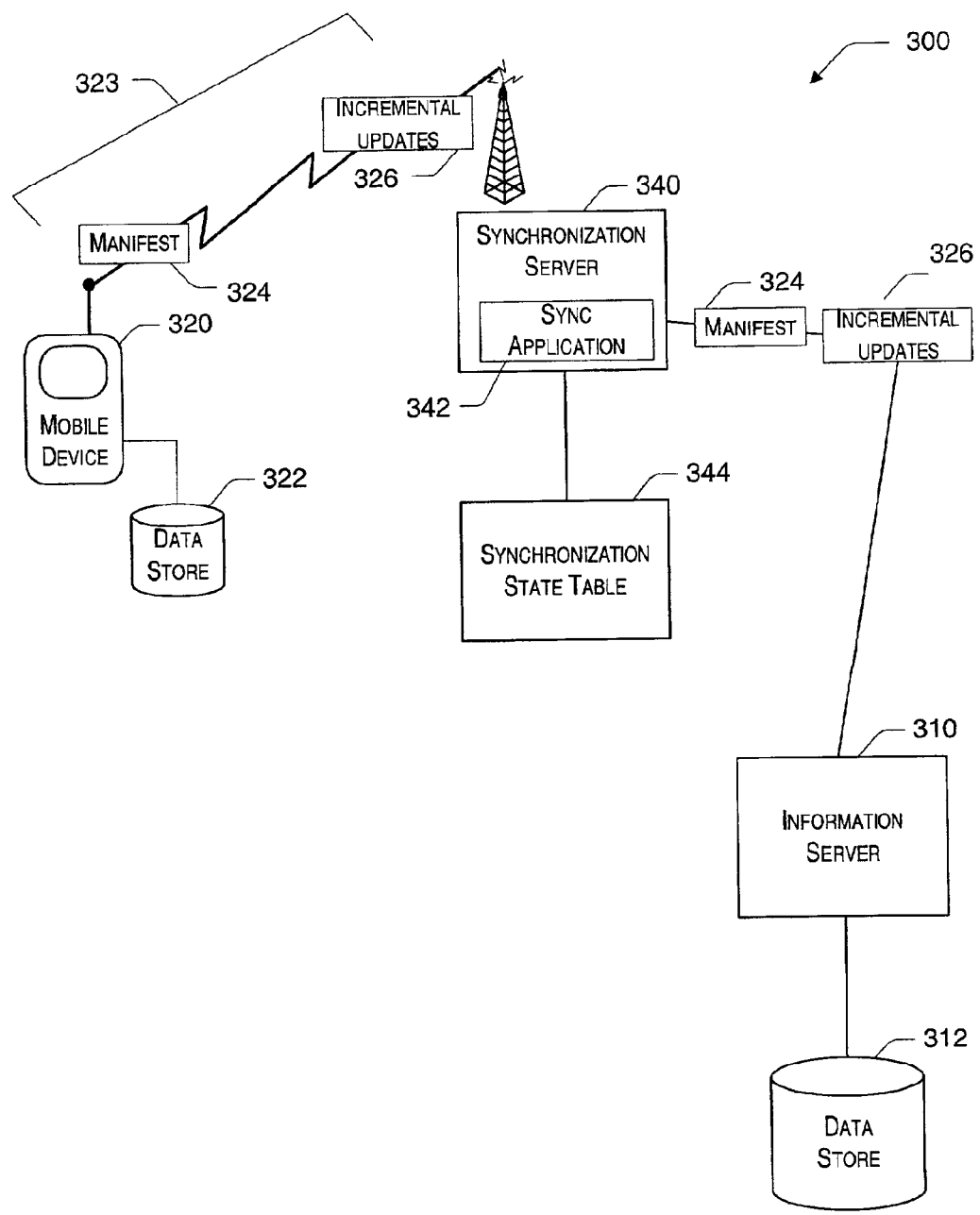
FIG. 3 is a functional block diagram of one exemplary synchronization system as implemented using the computer device shown in FIG. 1 and the mobile computing device shown in FIG. 2.

FIG. 3 is a functional block diagram generally illustrating one embodiment for a synchronization system 300 for synchronization between a fixed computing device, such as an information server 310 and a mobile device 320, in accordance with the present invention. In this implementation, the information server 310 is a computing device such as the one described above in conjunction with FIG. 1, and the mobile device 320 is a mobile computing device such as the one described above in conjunction with FIG. 2. A synchronization application 342 performs the synchronization process between the information server 310 and the mobile device 320. In the embodiment illustrated, the synchronization application 342 is resident on a synchronization server 340, which is a computing device as described above in conjunction with FIG. 1. Typically, a firewall (not shown) is located between the synchronization server 340 and the information server 310 to protect data that is accessible to the information server 310. In another embodiment, the synchronization application 342 may reside on information server 310.

The mobile device 320 maintains mobile data 322 locally in its storage 268 (shown in FIG. 2). As mentioned earlier, the mobile data 322 may include e-mail or other messages used by an e-mail application, contact information used by a PIM, appointment information used by a scheduling program, and the like. The mobile device 320 may change the mobile data 322 at anytime. Once the mobile data 322 is changed, server data 312 accessible by the information server 310 will not have correlating information until a successful synchronization occurs. Similarly, the information server 310 may change the server data 312, such as through any number of networked personal computers (not shown) connected to the information server 310. Again, once the server data 312 is changed, the mobile data 322 and server data 312 no longer correlate (i.e., data is not synchronized). In order for the mobile data 322 and the server data 312 to correlate (i.e., synchronized), the mobile device 320 initiates a synchronization session. The synchronization application 342 saves information regarding the synchronization sessions in a synchronization state table 344.

Briefly, in the synchronization session, synchronization data is transmitted between the mobile device 320 and the information server 310 using wireless technology. The synchronization data includes manifests 324 sent by the mobile device 320 and incremental updates 326 sent by synchronization application 342 to the mobile device. The incremental updates specify changes to the server data 312 since the last successful synchronization.

FIG. 4 is illustrates exemplary synchronization steps. At step 1, a synchronization initiator, such as a client, prepares an initial sync key and sends the sync key to a synchronization partner, such as a synchronization server. The server processes the received sync key at step 2. At step 3, the server returns the synchronization data to the client at step 3 at which point the client receives the synchronization data. After a successful synchronization, the client updates the synchronization key to reflect the successful synchronization. At some point in time after an initial synchronization, the client typically sends a synchronization request to the server to sync to a new sync checkpoint. In other words, the client requests to receive all data not synchronized since the last successful synchronization between the client and server.

Steps 4–8 illustrate two different synchronization attempts. At step 4 the client sends the last successful sync key indicating to the server to send changes in the data since the last successful synchronization. The server receives the request (step 4), processes the request (step 5) and returns the changed data to the client. In this particular example, the client receives all updates that have occurred after the initial synchronization between the client and server. The client receives the data and updates its data store.

Similarly, at step 7 the client requests to synchronize to include updates since the last successful synchronization. In this particular example, the last successful synchronization was requested at step 4. At step 8 the server processes the synchronization request from the client. In this particular example, the server sends the updates to the client, but all of the data does not reach the client. The server believes the client has been synchronized and updates its synchronization key, resulting in the client and server having the same valued synchronization key.

Steps 9 and 10 illustrate a client requesting to synchronize to a checkpoint that the server believes that the client has already been synchronized. At step 9, the client requests a synchronization from the same state as requested at step 7. The server receives the request (step 9) and recognizes that the last synchronization request was not successful for the client. The server, therefore, returns the updated entries to the client from the time of the sync checkpoint corresponding the synchronization key sent by the client.

Figure 5:
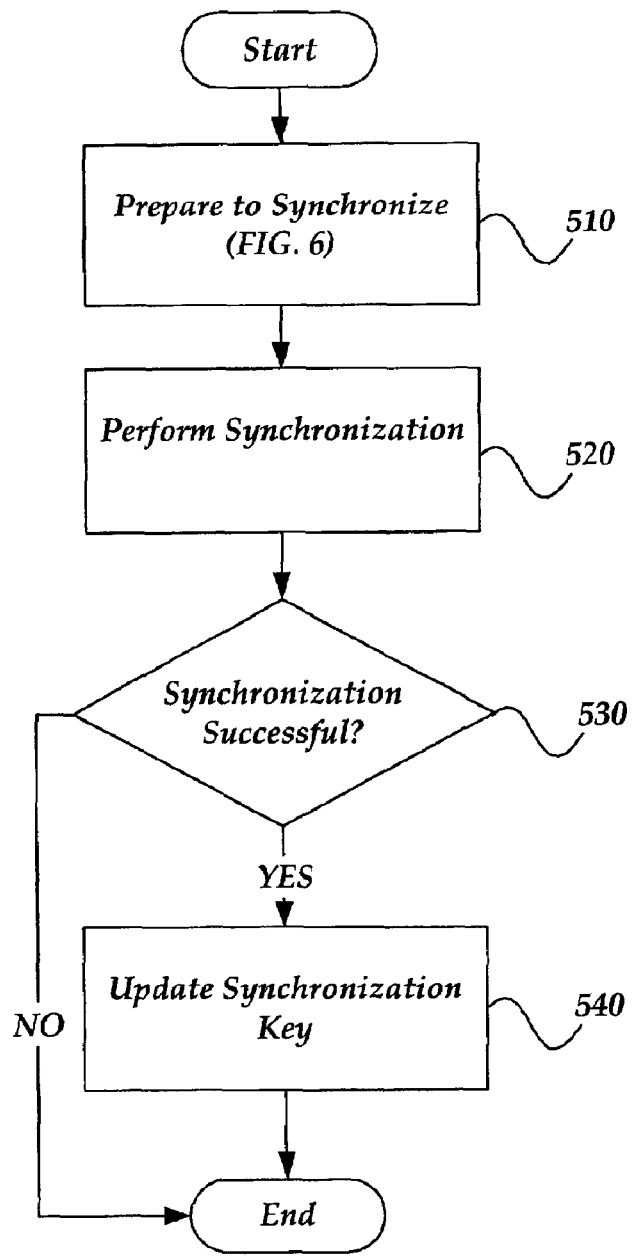
FIG. 5 is an overview flowchart illustrating synchronization.

FIG. 5 is an overview flowchart illustrating synchronization. At a start block, a synchronization process is initiated. The synchronization can be initiated by any of the synchronization partners. According to one embodiment of the present invention, a client desires to synchronize with a server. At a block 510, the client, or synchronization initiator, prepares for synchronization with the synchronization partner ("server"). (See FIG. 6 and related discussion). Successful synchronization brings the state of the data stores on the client and server to the same state at a specific synchronization checkpoint. Moving to a block 520, the synchronization is performed. Generally, the server sends data to the client containing all updates from the requested synchronization state to the current state of the server. The data may be sent to the client using many different methods, as is well known to those of ordinary skill in the art. At a decision block 530, a determination is made as to whether the synchronization is successful. A successful synchronization for a client means that the synchronization data received by the client was processed appropriately. A successful synchronization for a server means that the server believes that all of the synchronization data has been sent to the client. If the sync is not successful, the logical flow ends. If the sync is successful, the logical flow moves to a block 540 at which point the sync key stored on the client and server is updated to reflect the successful synchronization. The logical flow then ends.

Figure 6:
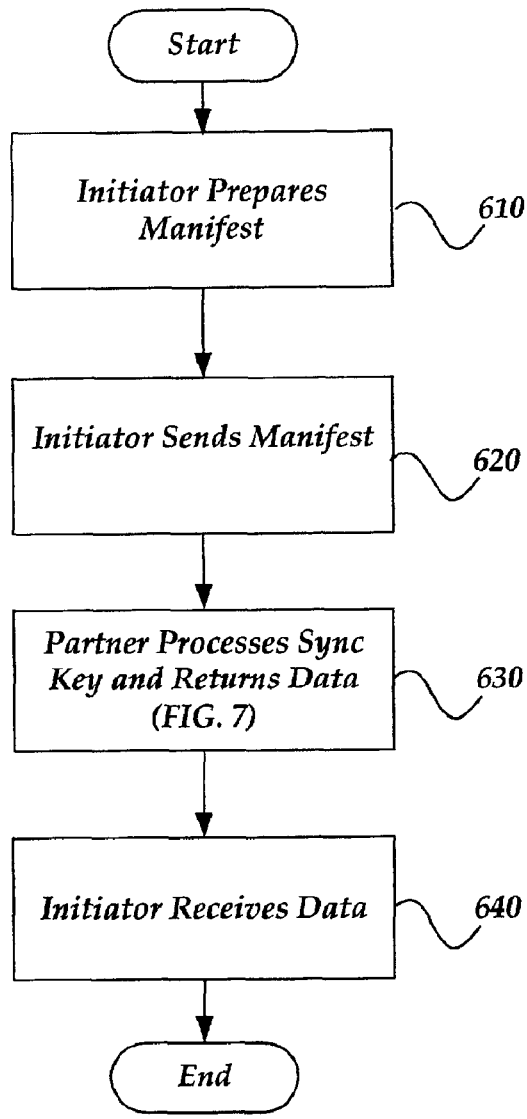
FIG. 6 shows a logical flow for preparing a synchronization request according to one embodiment of the invention.

FIG. 6 shows a logical flow for preparing for synchronization according to one embodiment of the invention. Starting at a block 610, a client prepares a synchronization manifest. According to one embodiment of the invention, a synchronization manifest includes identifying information about the client and a synchronization key. The synchronization key includes information indicating what checkpoint the client desires to synchronize from with the server. The synchronization key can be thought of as a synchronization attempt identifier. According to one embodiment of the invention, the sync key is an integer that starts at a value of minus one, and is incremented with each synchronization that is successful. Many other types of sync keys can be used. For example, the sync key could be a bit(s), float, character, and the like. Moving to a block 620, the client, or synchronization initiator, sends the manifest including the sync key to a synchronization partner, or server. The synchronization server receives the sync key and sends the client the requested synchronization data or an error message depending on the manifest and sync key received from the client (block 630) (See FIG. 7 and related discussion). Flowing to a block 640, the client receives the data and processes the data. The logical flow then ends.

Figure 7:
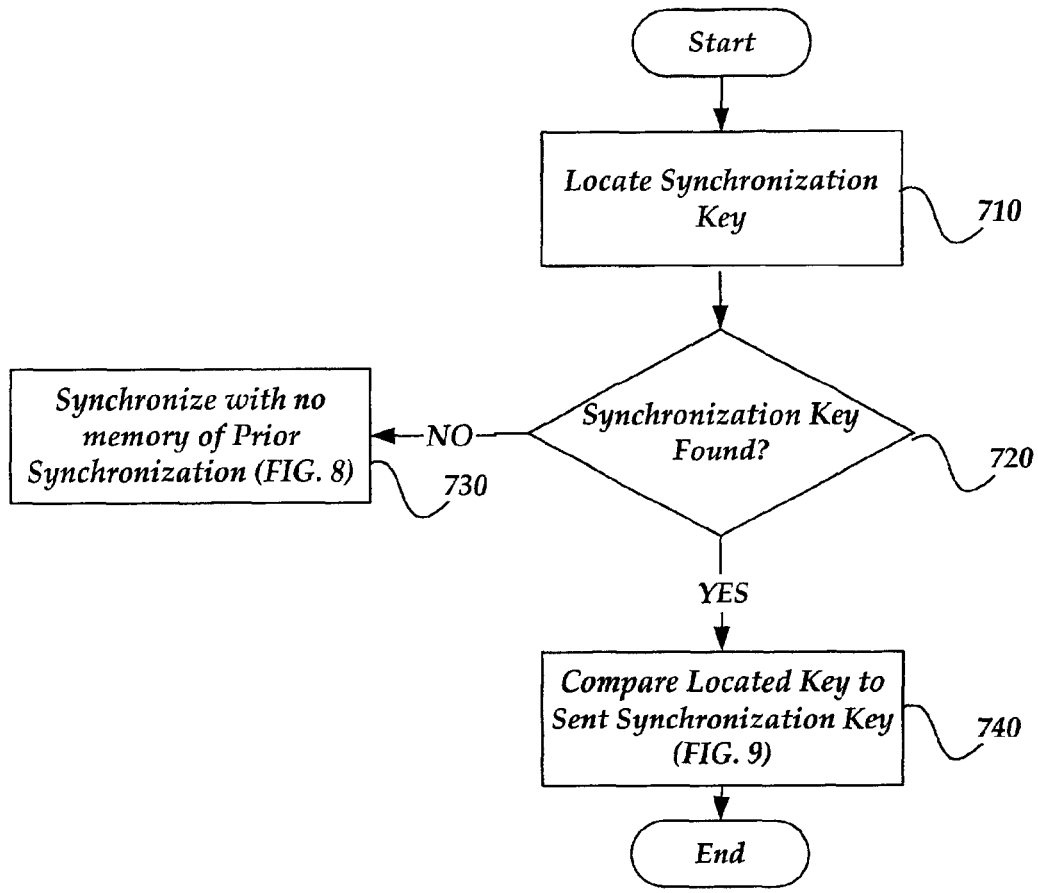
FIG. 7 illustrates a logical flow for processing a received sync key.

FIG. 7 illustrates a logical flow for processing a received sync key from a synchronization partner. Starting at a block 710, a synchronization server determines the last synchronization key associated with the client requesting synchronization. According to one embodiment of the present invention, the synchronization server searches for the synchronization key associated with the requesting synchronization client. Decision block 720 determines if the synchronization key for the client is located. If a synchronization key is not located for the client, the client is synchronized with no memory of a prior synchronization (block 730) (See FIG. 8 and related discussion). If a synchronization key relating to the client is located, then the logical flow moves to a block 740, at which point the server compares the located synchronization key to the synchronization key sent by the client (See FIG. 9 and related discussion) and responds appropriately.

Figure 8:
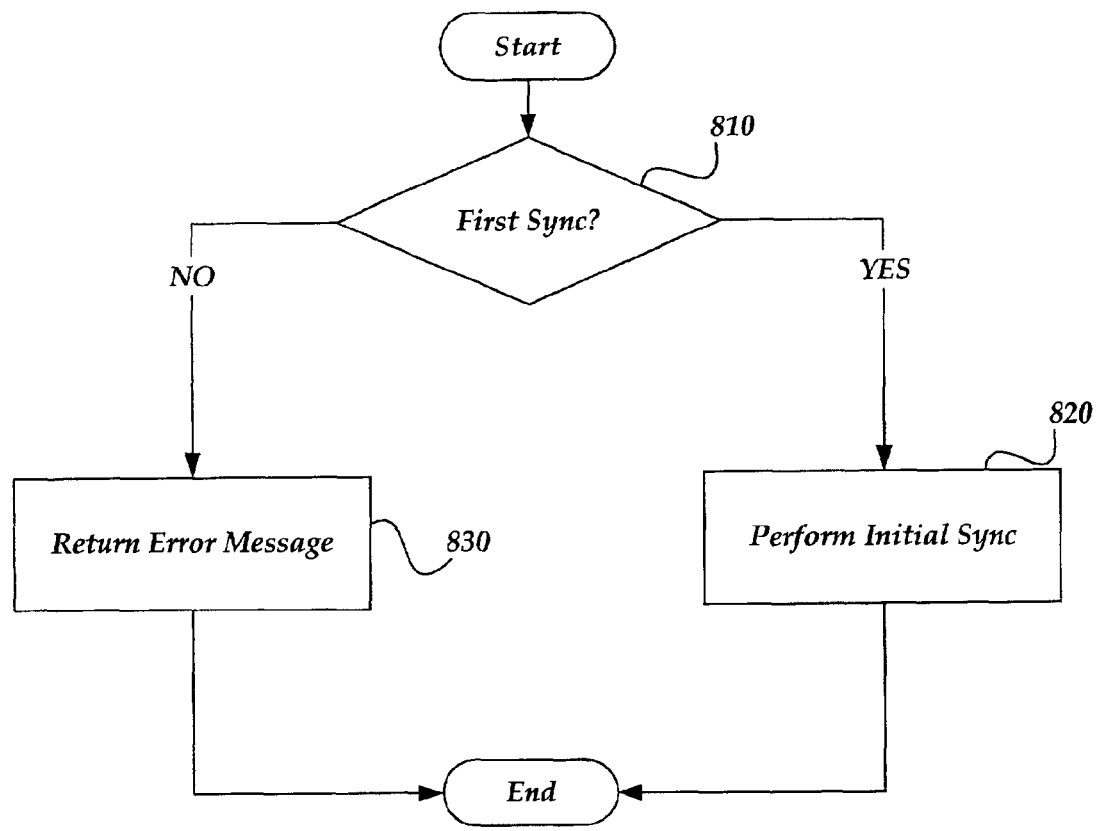
FIG. 8 illustrates a logical flow for when a synchronization key relating to the client is not located.

FIG. 8 illustrates a logical flow for when a synchronization key relating to the client is not located. Starting at a decision block 810, a determination is made as to whether this is the first, or initial, synchronization between the client and server. According to one embodiment of the invention, an initial synchronization is indicated by a sent sync key value of zero. If this is an initial synchronization, the logical flow moves to a block 820 at which point an initial synchronization is performed. An initial synchronization updates the client with all of the initial information stored on the server for the client. In other words, a synchronization is performed from scratch. If this is not an initial synchronization, the logical flow moves to a block 830 at which point an error message is returned. An error message indicates that a synchronization key should exist on the server, but that some error has caused the synchronization information to be lost for the client. The logical flow then ends.

Figure 9:
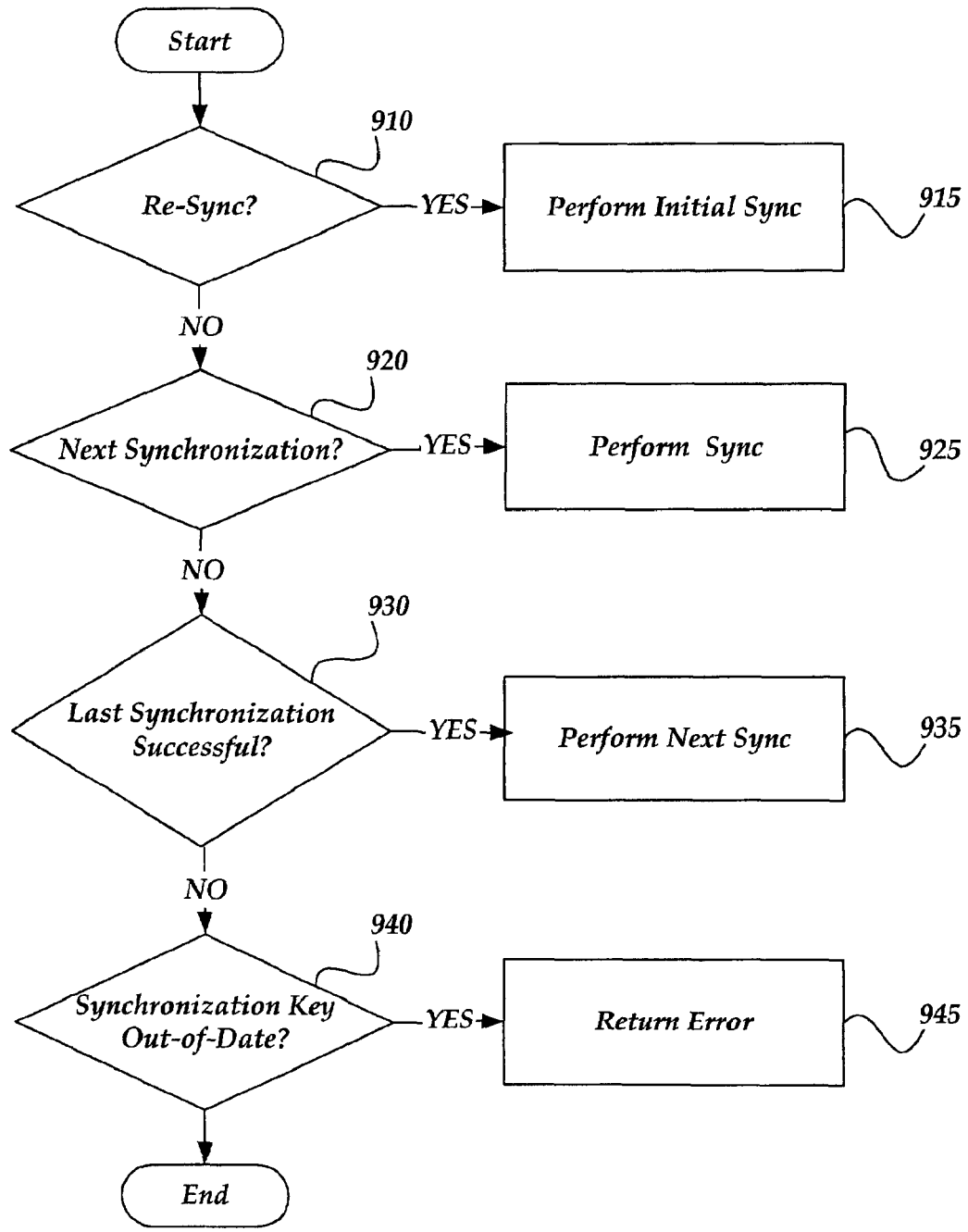
FIG. 9 illustrates a logical flow for performing a synchronization based on the sync keys.

FIG. 9 illustrates a logical flow for synchronization when a synchronization key related to the client is located. Starting with a start block and moving to a decision block 910, a determination is made as to whether a re-synchronization is requested. According to one embodiment of the invention, a re-sync is requested if the value of the sync key is zero. If the client is requesting a re-synchronization, the logical flow moves to a block 915. At a block 915, synchronization from an initial condition is performed. A re-synchronize request may occur in many different situations. For example, if the memory of the client was erased, or the client device was replaced with another similar device, such as when a device is upgraded. According to one embodiment of the invention, the client and server perform a re-synchronization as if the request was an initial synchronization request. The logical flow then ends.

When a re-synchronization is not requested, the logical flow moves to a decision block 920. At a decision block 920, a determination is made as to whether this is the next expected synchronization request. For example, an expected synchronization request occurs when the server receives a synchronization key indicating that the last synchronization was successfully performed. According to one particular embodiment of the invention, the expected synchronization key has a value of the server's synchronization key. For example, if the server's sync key has a value of 2, then the received value of the sent sync key would be 2. According to another embodiment, the expected synchronization key has a value of the server's synchronization key for the client plus one. For example, if the server's sync key has a value of 2, then the received value of the sent sync key would be 3. If this is the next synchronization request, the logical flow moves to a block 925, at which point the next synchronization is performed. The server returns data from the point of the last synchronization checkpoint to the current checkpoint. The logical flow then ends.

If the request is not for the next synchronization, the logical flow moves to a decision block 930. Decision block 930 determines whether the last synchronization was successful. If the synchronization was not successful, the logical flow moves to a block 935. According to one embodiment of the present invention, the received sync key value would be less than the server's sync key. In this situation, the server believes that a successful synchronization occurred for the last synchronization request from the client, but the client did not successfully synchronize to the last checkpoint. This situation can occur under many different scenarios. For example, data sent by the server may never have reached the client, or the client may not have properly processed the data. At a block 935 the client is synchronized to the current state of the server including the information on the server from the checkpoint of the last successful synchronization as indicated by the client.

If the last successful synchronization was successful, the logical flow moves to a decision block 940 that determines whether the sent synchronization key is out-of-date. According to one embodiment of the present invention, if the synchronization key is more than one requested synchronization state from the server's located synchronization key the synchronization key is out-of-date. For example, if the sent sync key has a value of 1, and the server has a sync key for the client having a value of 5 then the sync key is out-of-date. Similarly, if the received sync key has a value of 4, and the server has a sync key value of 2, the sync key is out-of-date. If the synchronization key is out-of-date, the logical flow moves to a block 945. According to one embodiment of the present invention, an error is returned to the client indicating that an improper synchronization key was received (block 945). According to another embodiment of the present invention, the server returns synchronization data from the synchronization checkpoint as indicated by the sent sync key. For example, suppose that five synchronizations have successfully occurred between the client and server. Under this example, the server may store all synchronization checkpoints and synchronize from any of the five checkpoints. If the client requests to synchronize with the server from state three, the server will send the data to the client checkpoint three to the current state to the client. Otherwise, the logical flow ends.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for synchronization, comprising:
    a synchronization initiator sending a sync key to a synchronization partner;
    determining a desired synchronization state to synchronize from the sent sync key; and
    the partner determining when the sent key is valid, and when the sync key is valid;
        attempting to synchronize with the initiator from the desired synchronization state to current state; and
        determining when the attempting synchronization was successful.

2. The computer-implemented method of claim 1, wherein determining the desired synchronization state to synchronize from based on the sent sync key, further comprises:
    determining a value of the sent sync key; and
    setting the desired synchronization state based on the value of the sent sync key.

3. The computer-implemented method of claim 2, wherein determining when the sent sync key is valid further comprises determining when a partner sync key exists related to the sent sync key; and when so:
    determining a previously stored value of the partner sync key; and
    comparing the value of the partner sync key to the value of the sent sync key.

4. The computer-implemented method of claim 3, wherein setting the desired synchronization state based on the value of the sent sync key, further comprises:
    determining when the desired synchronization state is an initial synchronization state based on the value of the sent sync key; and
    determining when the desired synchronization state is another valid synchronization state based on the value of the sent sync key.

5. The computer-implemented method of claim 3, wherein determining when the attempted synchronization was successful, further comprises:
the synchronization initiator determining when the synchronization was successful, and when so:
updating the sync key on the initiator; and
the synchronization partner determining when the synchronization was successful, and when so:
updating the partner sync key.

6. The computer-implemented method of claim 5, wherein determining when the desired synchronization state is another valid synchronization state based on the value of the sent sync key, further comprises, determining when the value of the sent sync key corresponds to a stored synchronization checkpoint.

7. The computer-implemented method of claim 6, wherein the sent sync key is an integer and the partner sync key is an integer.

8. A computer-readable medium having computer-executable instructions for synchronization, comprising:
client sending a sync key to a server;
determining a desired synchronization state from the sent sync key; and
attempting to synchronize with the client to the desired synchronization state.

9. The computer-readable medium of claim 8, further comprising:
determining when the attempted synchronization was successful; and
updating the value of the sent sync key when the synchronization was successful.

10. The computer-readable medium of claim 9, wherein determining the desired synchronization state from the sent sync key, further comprises:
determining a value of the sent sync key;
locating a server sync key having a value;
comparing the value of the sent sync key to the value of the server sync key; and
setting the desired synchronization state based on the comparison.

11. The computer-readable medium of claim 10, wherein setting the desired synchronization state based on comparison, further comprises at least one of:
setting the desired synchronization stare to an initial synchronization when the value of the sent sync key is zero; and
setting the desired synchronization state to a stored synchronization state of the server when the comparison determines that the value of the sent key relates to a stored synchronization state.

12. The computer-readable medium of claim 11, wherein determining when the attempted synchronization was successful, further comprises:
the client determining when the synchronization was successful, and when so:
updating the value of the sent sync key; and
the server determining when the synchronization was successful, and when so:
updating the value of the server sync key.

13. The computer-readable medium of claim 12, wherein updating the value of the sent sync key and updating the value of the server sync key, further comprises incrementing the value of the sync key stored on the client and the server sync key.

14. A system for synchronizing data, comprising:
a processor and a computer-readable medium;
an operating environment stored on the computer-readable medium and executing on the processor;
a communication connection device operating under the control of the operating environment; and
a synchronization device operating under the control of the operating environment and operative to perform actions, including:
receiving or sending a sync key to a synchronization partner;
determining a desired synchronization state from the sync key;
synchronizing with the client from the desired synchronization state to a current state; and
determining when the synchronization was successful.

15. The system of claim 8, further comprising updating the sync key when the synchronization was successful.

16. The system of claim 15, wherein determining the desired synchronization state from the sync key, further comprises:
determining a value of the sync key;
setting the desired synchronization state based on the value of the sync key.

17. The system of claim 16, wherein determining when the attempted synchronization was successful, further comprises determining when the synchronized data was processed, and when so updating the value of the sent sync key.

18. A computer-implemented method for synchronization, comprising:
a synchronization initiator sending a sync key to a synchronization partner, wherein the sync key indicates a synchronization state of the synchronization initiator;
the synchronization partner, receiving the sync key and determining a desired synchronization stare of the synchronization initiator based on the sync key;
transmitting synchronization data based on the synchronization state to the synchronization partner; and
updating the sync key to indicate a new synchronization state when the synchronization data is received by the synchronization initiator.

19. The system of claim 18, wherein determining a desired synchronization state of the synchronization initiator further includes comparing the sync key with a sync key associated with the synchronization partner.

20. The system of claim 19, further comprising:
determining when a synchronization has failed by comparing the sync key with the sync key associated with the synchronization partner; and
remedying the failed synchronization by transmitting synchronization data associated with the failed synchronization.

* * * * *